UNITED STATES PATENT OFFICE.

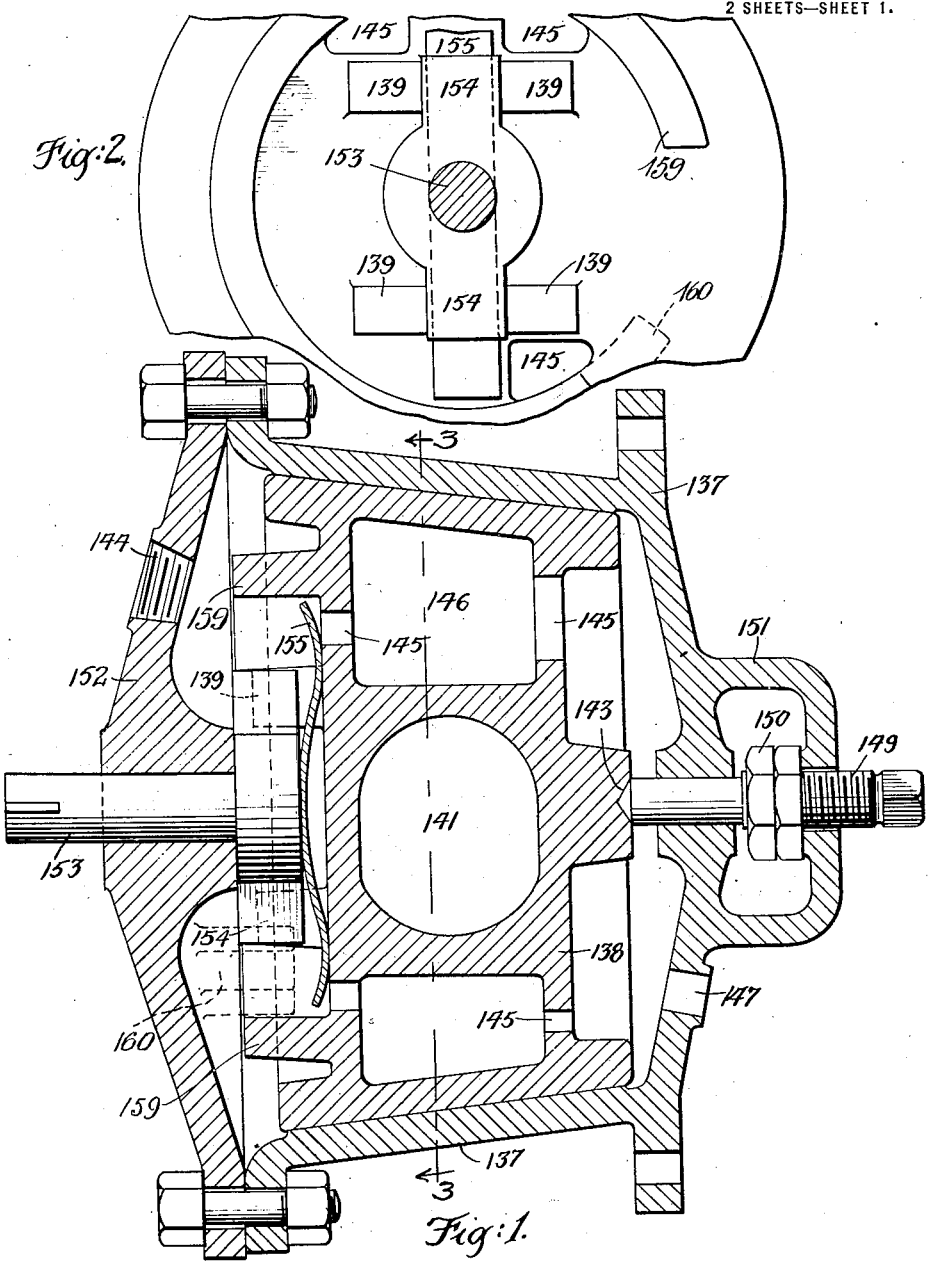

WILLIAM O. RENKIN, OF ORADELL, NEW JERSEY, ASSIGNOR TO QUIGLEY FURNACE SPECIALTIES CO., INC., A CORPORATION OF NEW YORK.

VALVE.

1,329,016.  Specification of Letters Patent.  Patented Jan. 27, 1920.

Application filed January 31, 1918. Serial No. 214,750.

*To all whom it may concern:*

Be it known that I, WILLIAM O. RENKIN, a citizen of the United States of America, residing at Oradell, county of Bergen, State of New Jersey, have invented certain new and useful Improvements in Valves, of which the following is a specification.

My invention relates to valves generally but, in the form herein shown, is more specifically designed to produce a valve of large capacity for use in handling large volumes of gas or air mixed with more or less finely divided solid material. My invention is particularly useful as a switch valve in systems of compressed air transport for solid material, *i. e.* systems in which considerable bodies of finely divided material, such as pulverized coal for instance, are carried from place to place through closed conduits or pipes by the action of rapidly moving currents of air. This requires the use of large valves, and if such large valves are given an air-tight, or nearly air-tight, fit they are liable to stick. Such sticking of a valve and consequent shutting down of the whole or part of the system while the valve is taken out and cleaned, might result in the chilling of furnaces so deprived temporarily of fuel, or other serious consequences. It is therefore necessary for such purposes to have a valve in which any tendency to stick can be promptly overcome without taking the valve apart. Furthermore, the fine dust, involved in material of the character described, is apt to deposit in the many necessary cavities of a large valve and interfere with its continued efficient operation. These and other difficulties in the operation of large valves of this character are overcome by my present invention, which is illustrated in the best form at present known to me in the accompanying two sheets of drawing in which.

Figure 1 is an axial central section of a two-way valve.

Fig. 2 is a plan view with parts broken away, or shown in section, and the cover plate removed.

Figure 3:
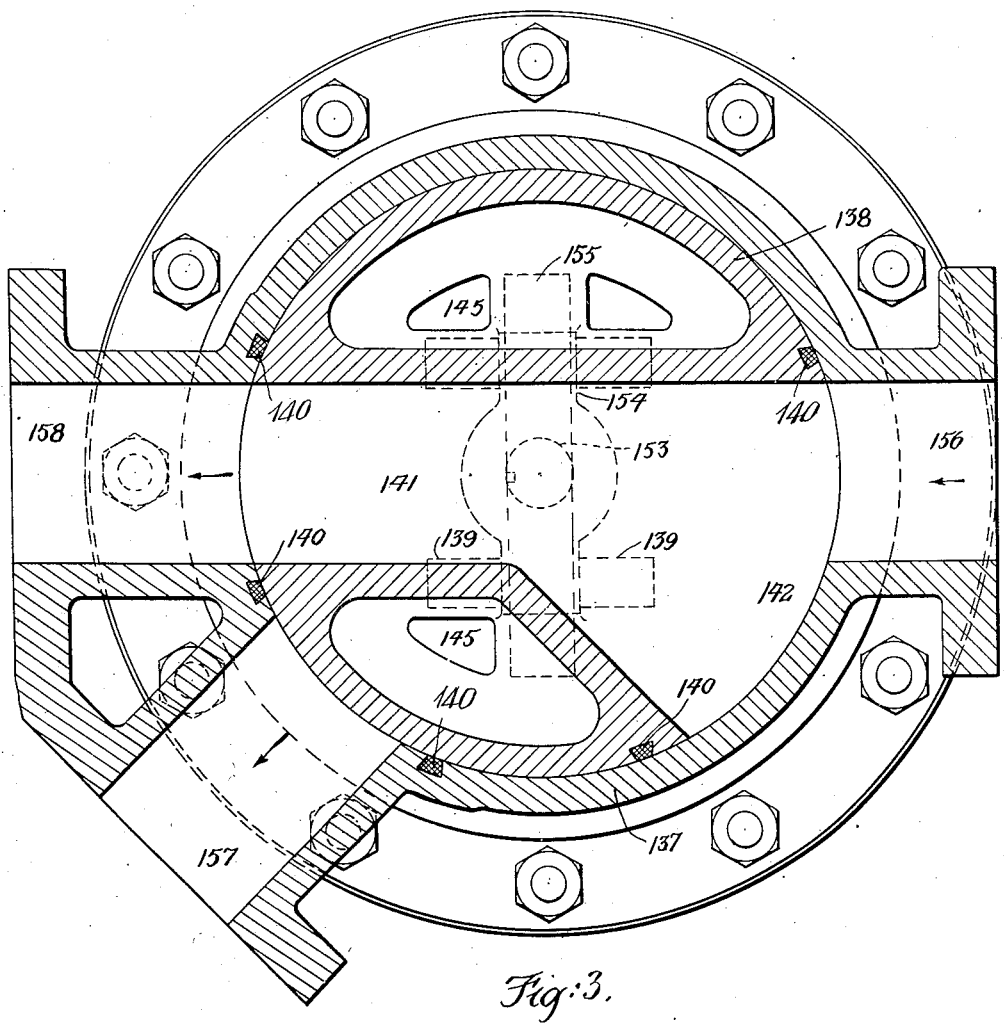
Fig. 3 is a cross section on line 3—3 of Fig. 1.

Throughout the drawings like reference characters indicate like parts. The form of the invention herein shown is a large plug valve for use in compressed air systems for pulverized coal transport. In these systems the coal is dried and milled at a centrally disposed milling plant and thence distributed through a pipe line to a series of more or less scattered furnaces or other points of consumption. At each branch of the pipe line (leading to a particular point of consumption) a valve must be located to control the flow of air and coal so that it may pass on through the main, or trunk, line conduit or be diverted to the local branch. Closure valves are also needed at various points in the system. In the particular system for which this valve was invented by me the greater part of the pulverized coal passes along the pipe lines in the form of slugs, or detached masses, which are of a diameter to fill the pipe and in length are five or six times the diameter of the pipe. Between these slugs are bodies of much more nearly pure air, in which, however, more or less coal dust is suspended.

These valves must be of large capacity to handle the comparatively large volume of air and slugs of pulverized coal propelled thereby, and they must be tight enough to prevent leakage of air. These two requirements of size and tightness make them very liable to stick, both from the effect of friction and collection of coal dust in them. Of course it would be fatal to the success of the system if these valves should stick so that they could not be opened or closed, since it would require a complete shutting down of the whole apparatus while the valves were taken out or loosened up, after opening the valve casing. My invention overcomes these difficulties by furnishing a valve which can be instantly freed when it sticks and which can be easily cleaned without removal from its casing. The type of valve shown is a plug valve with a comparatively small degree of taper, made of a hollow casting through which compressed air may be forced from one end of the casing to the other so as to drive out accumulated dust and dirt. This plug is operated by a loose connection from its spindle so that it is capable of motion along the line of its axis and is provided with means through which externally applied pressure can promptly lift the valve temporarily from its seat in case it has become stuck therein so that it can not be turned.

Referring to the drawings, 137, is the valve casing and 138, the tapered hollow plug seated in said casing and having radial passages 141, therethrough. Assuming that the valve here illustrated is in the position to keep the main line open and shut off the branch, the ports 156 and 158, will be the ones that connect with the said line, while port 157 connects with the branch pipe. The wide port 142, of the plug passage 141, is broad enough so that it will maintain connection with the valve casing port 156, when the other narrower end of the plug passageway registers with the branch port 157, as well as when it registers with the port 158, in the position shown in Fig. 3. On top of the plug 138, are four lugs 139, between which drop the radial extensions 154 of the valve spindle 153. This spindle is mounted in the valve casing cover 152, and on its projecting end may be keyed any device for rotating the valve. Beneath the spindle 153, is the flat spring 155, the ends of which bear upon the larger end of the valve plug and normally force the same down into its tapered seat. 140, 140, are packing strips of soft metal dovetailed into the surface of the plug or of the valve casing, as shown in Fig. 3. 143, is a concial recess formed in the center of the smaller end of the valve plug 138, and 149, is a pointed bolt mounted in the center of the smaller end of the valve casing and which registers with said recess 143. This bolt is held within limits in its position by means of the adjusting nuts 150, which strike against the outer surface of the valve casing 137, or the inner surface of the cage 151, which latter forms an additional bearing for the bolt 149. 144, is an opening in the valve cover to which a compressed air clearing-out pipe may be connected. 145, 145, are openings in the plug walls connecting with the cavities 146, in the plug, and 147, is an outlet opening in the smaller end of the valve casing. When the compressed air for clearing out purposes is turned on, it will enter through opening 144, pass through all the open spaces in and around the switch valve and blow out through discharge opening 147, all of the accumulated dust and other movable solid matter.

The spring 155, holds the plug down to its seat so that the valve is at all times tight, affording an effective closure to whichever port 157 or 158, is blanked off. The nuts 150, are so adjusted that the pointed bolt 149, will touch the plug and act normally as a pivot support to hold it adjusted on its seat. If, however, the valve plug sticks so that it can not be turned through twisting of the spindle 153, a blow from a hammer on the outer end of the pointed bolt 149, will drive said bolt in and force the valve plug off of its seat, thus releasing the valve from the sticking action. The spring 155, yields of course and allows the plug to move axially relative to spindle 153, with which it has only a loose connection by reason of the engagement of the spindle arms 154, with the lugs 139. After the valve plug is so released the spring 155, forces it back to its seat and renders the valve tight again against pressure of air therein.

It is obvious that while I have only shown the invention as applied to a two-way valve, it could be equally well applied to valves of other constructions.

In a two-way construction, such as shown in the drawings, having a wide port 142, in the plug coöperating with a narrower port 156, in the casing, and a narrower port 141, adapted to register alternately with two ports 157 and 158, in the casing, of corresponding width, it is desirable that the packing strips 140, controlling ports 142 and 156 be mounted in the plug, so that they may always be outside the mouth of wider port 142, as shown. When these packing strips are in the member having the wider port, they will not have to pass the edges of the narrower port in the other member and so there will be no opportunity for them to jump out of their seats. Another advantage of the described arrangement of packing strips 140, is that, none of the material passing through the valve can get into the cavities between the valve plug and casing. On the other hand the packing strips for ports 157 and 158 may be mounted in the casing, as shown, because the strip located outside of the two ports 157, 158 (which together form the equivalent of wider port 142) are never uncovered by port 141, and the strip between ports 157 and 158 will be exposed during the valve travel, in whichever member it is mounted. The underlying principle is that where the width of coöperating ports of valve and casing are different, the packing strip should be seated in the member having the greater port width.

159 is a curved stop rib cast on the larger end of the valve plug 138. Between the ends of this rib is located a stop lug 160, cast on the under side of valve cover 152. The position of this lug relative to the ends or rib 159, is indicated in dotted lines in Figs. 1 and 2. This lug limits the angular movement of valve plug 138, by serving as a stop against which the ends of rib 159, strike when the valve reaches the end of its proper movement.

Having described my invention, I claim:

1. A valve having a circumferentially ported casing and a rotating radially perforated plug in combination, which plug is provided with air passages extending endwise through the plug and separate from any radial passages therethrough, and with openings in either end of the casing, whereby a current of fluid may be passed through casing and plug for the purpose of cleaning out matter accumulated in the casing.

2. A valve having a tapered, perforated, rotatable plug and a fixed ported casing, in combination with an adjustable pointed bolt serving as a centering pin mounted on the casing and adapted to have a limited amount of end play therein and bearing against the smaller end of the valve plug, and a spring bearing on the larger end of the plug and forcing it down on said centering pin whereby the valve may be axially adjusted and elastically held in proper position but may be temporarily unseated by a blow on the outer end of the centering pin without permanently destroying said adjustment.

3. A valve having a tapered, perforated, rotatable plug and a fixed ported casing, in combination with an adjustable pointed bolt serving as a centering pin mounted on the casing and bearing against the smaller end of the valve plug, a spring bearing on the larger end of the plug and forcing it down on said centering pin, and a valve operating handle mounted in the casing and having an axially yielding connection with the plug.

4. A valve for use in controlling the flow of fluids carrying in suspension a large proportion of finely divided solid matter, which valve has in combination a fixed, ported casing and a rotatable, tapered plug therein, the plug being provided with an air passage extending endwise therethrough separate from the radial valve passages, the casing having openings in either end and means for closing said openings, and the plug having ports of different widths from the coöperating ports in the valve casing, packing strips adjacent to the port edges extending transversely to the plane of rotation of the plug and seated in the valve member which has the port of greater width, an adjustable pointed bolt serving as a centering pin mounted on the casing and bearing against the smaller end of the valve plug, a spring bearing on the larger end of the plug and forcing it down on the centering pin, and a valve operating handle mounted in the casing and having an axially yielding connection with the plug.

WILLIAM O. RENKIN.

Witnesses:
L. E. TURK,
J. F. McCARTHY.